US008271872B2

(12) United States Patent
Salvucci

(10) Patent No.: US 8,271,872 B2
(45) Date of Patent: Sep. 18, 2012

(54) COMPOSITE AUDIO WAVEFORMS WITH PRECISION ALIGNMENT GUIDES

(75) Inventor: Keith D. Salvucci, Belmont, CA (US)

(73) Assignee: Apple Inc., Cupertino, CA (US)

( * ) Notice: Subject to any disclaimer, the term of this patent is extended or adjusted under 35 U.S.C. 154(b) by 1162 days.

(21) Appl. No.: 11/325,886

(22) Filed: Jan. 4, 2006

(65) Prior Publication Data

US 2006/0150072 A1    Jul. 6, 2006

Related U.S. Application Data

(60) Provisional application No. 60/642,138, filed on Jan. 5, 2005.

(51) Int. Cl.
*G06F 17/00* (2006.01)
(52) U.S. Cl. .................. 715/255; 715/202; 715/203
(58) Field of Classification Search .................. 715/500, 715/201, 202, 203, 255
See application file for complete search history.

(56) References Cited

U.S. PATENT DOCUMENTS

| | | | | |
|---|---|---|---|---|
| 5,204,969 A | * | 4/1993 | Capps et al. .................. 704/278 |
| 5,371,851 A | * | 12/1994 | Pieper et al. .................. 345/501 |
| 5,467,288 A | * | 11/1995 | Fasciano et al. .................. 715/716 |
| 5,642,171 A | * | 6/1997 | Baumgartner et al. ....... 348/515 |
| 5,691,493 A | * | 11/1997 | Usami et al. .................. 84/602 |
| 5,732,184 A | * | 3/1998 | Chao et al. .................. 386/55 |
| 5,874,950 A | * | 2/1999 | Broussard et al. ............. 715/203 |
| 5,999,173 A | * | 12/1999 | Ubillos .................. 715/724 |
| 6,160,548 A | * | 12/2000 | Lea et al. .................. 715/723 |
| 6,175,632 B1 | * | 1/2001 | Marx .................. 381/56 |
| 6,332,147 B1 | * | 12/2001 | Moran et al. .................. 715/203 |
| 6,414,914 B1 | * | 7/2002 | Lee et al. .................. 369/30.05 |
| 6,421,470 B1 | * | 7/2002 | Nozaki et al. .................. 382/321 |
| 6,602,299 B1 | * | 8/2003 | Basso et al. .................. 715/203 |
| 7,512,886 B1 | * | 3/2009 | Herberger et al. ............. 715/723 |
| 2002/0175917 A1 | * | 11/2002 | Chakravarty et al. ......... 345/473 |
| 2003/0014135 A1 | * | 1/2003 | Moulios .................. 700/94 |
| 2004/0037202 A1 | * | 2/2004 | Brommer et al. ............. 369/94 |
| 2005/0005760 A1 | * | 1/2005 | Hull et al. .................. 84/645 |

(Continued)

OTHER PUBLICATIONS

A Synchronization Mechanism for Continuous Media in Multimedia Communications Yutaka Ishibashi and Shuji Tasaka Department of Electrical and Computer Engineering, Nagoya Institute of Technology, Nagoya 466, Japan, IEEE 1995.*

(Continued)

*Primary Examiner* — Stephen Hong
*Assistant Examiner* — Ahamed I Nazar
(74) *Attorney, Agent, or Firm* — Hickman Palermo Truong Becker Bingham Wong LLP; Daniel D. Ledesma

(57) ABSTRACT

A technique for aligning a plurality of media clips is provided. One or more intra-clip points of interest (POIs) are identified in at least a first media clip. When aligning a first point in the first media clip with a second point in a second media clip, the first point may be snapped to the second point, wherein at least one of the first point and second point is an intra-clip POI. When a snap occurs, at least one of a visual or audible indication is generated, such as a "pop" sound, a snap line, or automatically aligning the first point with the second point when the first point is within a specified number of pixels of the second point. Techniques for representing multiple channels of an audio clip as a single waveform and caching waveforms are also provided.

36 Claims, 5 Drawing Sheets

U.S. PATENT DOCUMENTS

| | | | |
|---|---|---|---|
| 2005/0010409 A1* | 1/2005 | Hull et al. | 704/243 |
| 2005/0160380 A1* | 7/2005 | Konar et al. | 715/858 |
| 2005/0218863 A1* | 10/2005 | Edelson | 318/727 |
| 2005/0278044 A1* | 12/2005 | Chen et al. | 700/94 |
| 2005/0286497 A1* | 12/2005 | Zutaut et al. | 370/352 |
| 2006/0259862 A1* | 11/2006 | Adams et al. | 715/716 |
| 2007/0104279 A1* | 5/2007 | Taniguchi | 375/259 |
| 2008/0250338 A1* | 10/2008 | Konar et al. | 715/767 |

OTHER PUBLICATIONS

An Interactive Digital Television System Designed for Synchronised and Scalable Multi-media Content over DVB and LP Networks Takebumi Itagaki, John Cosmas, Muhammed Haque Department of Electronic and Computer Engineering,, Brunel University, Uxbridge UB8 3PH, U.K., 2004 IEEE.*

Real-Time Resource Reservation for Synchronized Multimedia Object over Wireless LAN Husni Fahmi, Mudassir Latif, Basit Shafiq, Ray Paul, Arif Ghafoor School of Electrical and Computer Engineering, Purdue University, West Lafayette, IN 47907 Department of Defense, 2002 IEEE.*

Content Analysis for Audio Classification and Segmentation Lie Lu, Hong-Jiang Zhang, Senior Member, IEEE, and Hao Jiang_Oct. 2002.*

"Creating Music Videos using Automatic Media Analysis", by Foote et al., FX Palo Alto Laboratory, Inc., Palo Alto, CA 94304, USA.*

Doherty et al. ("A Hitchcock Assisted Video Edited Night at the Opera", FX Palo Alto Laboratory, Palo Alto, CA 94304, p. 660-661, hereinafter as Doherty).*

("A Multi-View Intelligent Editor for Digital Video Libraries", by Myers et al., Human Computer Interaction Institute, Carnegie Mellon University, Pittsburgh, PA 15213, USA, p. 1-p. 10).*

Wilson, WAVE PCM soundfile format, 2003, craig@ccrma.stanford.edu, pp. 1-4.*

Graft, Smart Resize, 2001, pp. 1-5.*

"Calibration Run with N2 Laser" retrieved on Mar. 14, 2006 from the Internet < URL: http://www.amanda.uci.edu/twr/twr02/rootfiles/index.html > (8 pages).

"Tektronix WFM300A Component/Composite Waveform Monitor" retrieved on Mar. 14, 2006 from the Internet < URL: http://www.trs-rentelco.com/Model/TEK_WFM300A.aspx > (3 pages).

* cited by examiner

COMPOSITE AUDIO WAVEFORMS WITH PRECISION ALIGNMENT GUIDES

PRIORITY CLAIM

This application is a nonprovisional application of and claims the benefit of priority from U.S. Provisional Application No. 60/642,138, filed on Jan. 5, 2005, entitled "Composite Audio Waveforms with Precision Alignment Guides"; the entire content of which is incorporated by this reference for all purposes as if fully disclosed herein.

BACKGROUND

The approaches described in this section are approaches that could be pursued, but not necessarily approaches that have been previously conceived or pursued. Therefore, unless otherwise indicated, it should not be assumed that any of the described approaches qualify as prior art merely by virtue of their inclusion in this section.

Digital audio players or video players are capable of playing audio and video data from digital files, such as, for example, MP3, WAV, or AIFF files. Known digital audio or video players are capable of showing basic information about a media file, such as the name of the file and any status or progression information regarding the playback process if the audio or video file is being played back on a digital audio or video player. This same type of information is available to and displayed by video, audio, and movie editing software.

FIG. 1 illustrates digital movie editing software that shows the name 102 of an audio file 101, basic time length information 104 associated with audio file 101, and a progression status bar 106. While this information is useful and, indeed, necessary in digital media editing, it would be beneficial to be able to see more detailed information about audio data, such as audio intensity over time, via a visual representation.

Sometimes, audio data is comprised of multiple channels, such as a surround sound mix which could have six or more channels. Thus, the additional detailed information, alluded to above, could be presented with six or more visual representations, each visual representation associated with one channel. Not only do such visual representations occupy much space on a computer display, but much of the information may not necessarily be useful (i.e., the type of digital media editing a user wants to perform does not require editing multiple channels), unless a user is interested in working specifically on one or more of those channels.

Another problem associated with digital media editing is generating visual representations of media files, such as audio clips. Significant time and memory is required to read in all the audio data for a given audio clip and then generate a visual representation based on the audio data.

Lastly, many users of media editing software wish to align two or more media clips. For example, a user may wish to begin a video clip as soon as an audio clip begins. However, often times an audio clip begins with silence and a video clips begins with blank video. Furthermore, there may be many places within a video and audio clip, other than where the audio begins, in which a user may wish to align the media clips. Thus, it is likely that simply aligning the beginning or ending (i.e., edges) of a video clip with an edge of an audio clip may not produce the desired results.

Because simply aligning the edges of media clips may not produce the desired results, editors of digital media may have to manually edit each clip, such as deleting "silence" at the beginning of a media clip, or manually aligning the media clips with a selection device, such as a mouse. Each of these latter techniques are prone to producing less than precise alignments where too much or too little audio is deleted at the beginning of an audio clip (when manually editing) or where a video clip may not start exactly when audio begins (when manually aligning).

BRIEF DESCRIPTION OF THE DRAWINGS

The present invention is depicted by way of example, and not by way of limitation, in the figures of the accompanying drawings and in which like reference numerals refer to similar elements and in which.

DETAILED DESCRIPTION

Overview

Figure 1:
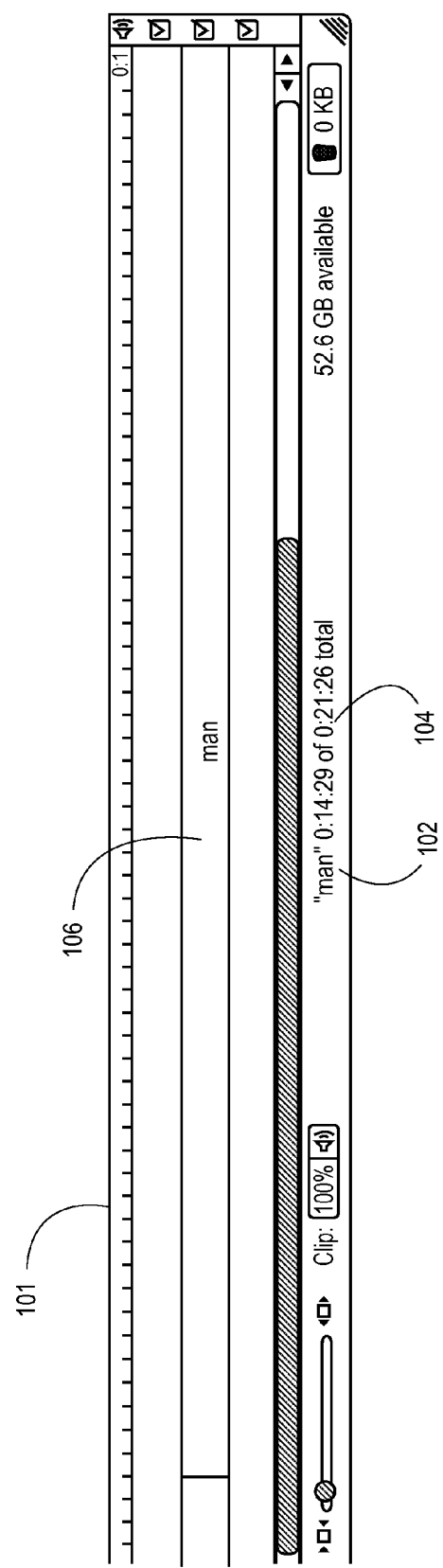
FIG. 1 is a representative screenshot of digital movie editing software displaying basic information about an audio clip without any accompanying graphic waveforms.

Techniques are described hereafter for providing detailed information about audio when editing digital media, for example. Additional information may be displayed while an audio clip is being played as well as when the audio clip is not being played. An example of information that may be displayed is information about volume intensity at different points in time in an audio clip. Certain points of interest within an audio clip may also be automatically identified for "snapping."

Information about an audio clip could be used when editing movies or other video data to more accurately synchronize video data with audio data, for example. Additionally, graphical audio waveforms corresponding to audio in a video file may be used to detect potential problems in the video file, such as loud outbursts from crowds of people. Graphical audio waveforms may also be used to identify points in a soundtrack to place edit points. Other benefits of allowing users to view information about audio data in a file, such as graphical waveforms representing intensity levels over time, will be apparent to those skilled in the art.

Composite Audio Waveform

The techniques described herein may be implemented in a variety of ways. Performance of such techniques may be integrated into a system or a device, or may be implemented as a stand-alone mechanism. Furthermore, the approach may be implemented in computer software, hardware, or a combination thereof.

The techniques described herein provide users with a single visual waveform graphic that represents a characteristic produced collectively by multiple tracks of audio data in a media clip. Media data is digital data that represents audio or video and that can be played or generated by an electronic device, such as a sound card, video card, or digital video recorder. A media clip is an image, audio, or video file or any portion thereof. A single waveform that reflects a characteristic produced collectively by multiple tracks is referred to herein as a "composite audio waveform".

A displayed composite audio waveform may help in a variety of ways, such as to help a user to synchronize a song or sound clip to match action in a video clip. Embodiments that make use of the composite audio waveform to synchronize audio and video are useful in digital movie editing software.

According to one embodiment, the composite audio waveform is a representation of the audio intensity (volume) produced by combining all tracks found within the audio media clip.

A composite audio waveform that reflects the collective intensity of all tracks within an audio clip may be used to see where an audio clip builds in intensity. Users of movie editing software may use the visual cues provided in the composite audio waveform to align video frames to the audio. For example, users may use composite audio waveforms to align video to audio events, such as a certain drumbeat or the exact beginning or end of the audio.

In one embodiment, users have an option of turning the visual display of graphic waveforms on or off. For example, an option to turn waveforms on or off may be a preferences option. In another embodiment, the displayed waveforms may be resized or zoomed in on, allowing a user to see more details of the waveform when desired. For example, a user could select a waveform and press up and down arrows to change the zoom.

According to one embodiment, the technique of generating and displaying a composite audio waveform may be applied to the audio within video clips, as well as to audio clips themselves. Audio from a video clip may be extracted from video clips that also include audio tracks. Extracting audio from a video clip allows users to move or copy the audio to a different place within a movie.

An individual audio clip may be composed of a number of channels, e.g., two channels for stereo data—one for the left speaker and one for the right speaker. In one embodiment, all channels are coalesced into a single waveform that represents all channels. That is, one waveform shows the combined audio intensity for all channels of an audio clip. A single waveform may show a cumulative intensity, for example, by summing the intensity volumes of the separate channels.

Figure 2:
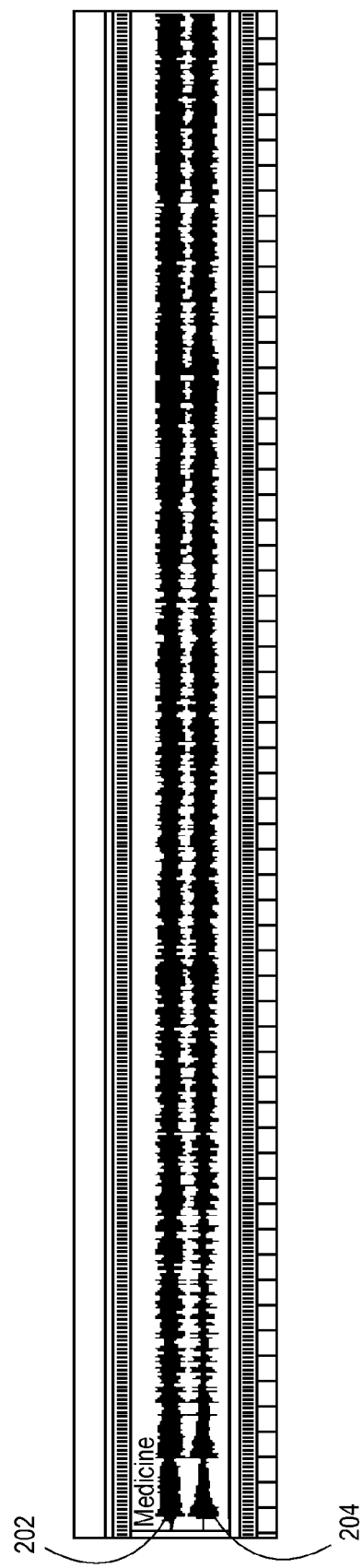
FIG. 2 illustrates two individual audio waveforms, each representing two channels of audio data that are coalesced to create the single composite waveform of FIG. 3.
Figure 3:
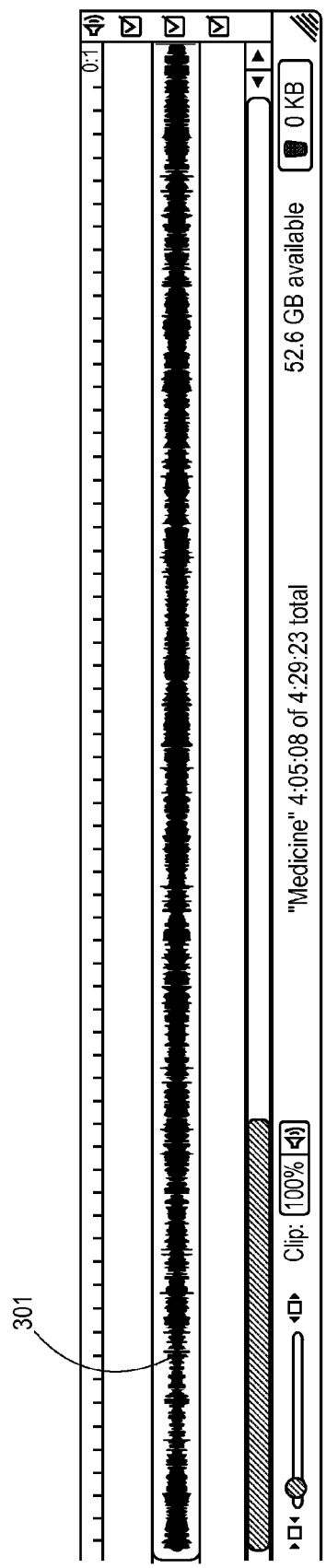
FIG. 3 is a representative screenshot of digital movie editing software displaying information about an audio clip that includes a single composite waveform that represents two channels of audio data, according to an embodiment of the invention.

FIG. 2 illustrates two individual audio waveforms, each representing two channels of audio data that are combined to create the single composite waveform of FIG. 3. As shown, the sound in channel 202 is more intense at the beginning of the audio clip than the sound in channel 204. This could occur, for example, from a guitar coming from the right speaker at the beginning of a song, but not from the left.

FIG. 3 illustrates digital movie editing software that includes the ability to display a waveform graphic 301 for audio clip 101 of FIG. 1, according to an embodiment of the invention. As shown, waveform graphic 301 indicates the average intensity of the audio data in the audio clip over time. Waveform graphic 301 represents a single composite waveform that represents audio from an audio clip having multiple audio channels (e.g., a stereo audio clip), where the multiple channels are coalesced into one composite waveform.

Summing, or coalescing, the two audio channels of FIG. 2 into a single composite waveform as in FIG. 3 makes editing movies with audio more user-friendly and less confusing, while simultaneously conserving screen space on the user's display. The process of coalescing multiple channels into a single composite waveform may include summing, decimating, and reducing the bit depth of audio samples as described in more detail herein.

Forming the Composite Waveform

In one embodiment, to form the composite waveform, data is decimated using a 128 point sinc function to reduce the amount of data being managed in the application. A 128 point sinc function is not required, and in alternative embodiments, various sinc functions may be used, such as a 400 point sinc function. Any sinc function or any other method for downsampling audio data may be used.

A sinc function sinc(x), or "sampling function," is a function associated with digital signal processing and the theory of Fourier transforms. The full name of the function is "sine cardinal," but may be referred to as "sinc." Sinc filters may be used in many applications of signal processing. In one embodiment, a sinc process is used to take multiple sequential samples of digital audio data and reduce them to one sample that is a weighted average of all of the samples.

For example, consider an audio file with one channel (i.e. a mono audio file). The goal is to reduce the total number of samples in the audio file but still have a usable, representative signal. A 128 point sinc function will take 128 audio samples at a time, and reduce them to one sample that represents all 128 audio samples. In embodiments of the present invention, this process is iterated over the entire audio file and creates a file (or creates data in memory) that is $128^{th}$ the size of the original file.

Sinc filtering may be considered a "weighted average" using coefficients generated from a sinc function. In one embodiment of the present invention, the sinc function used is:

$$\mathrm{sinc}(x) = \sin(x)/x$$

where x is the absolute value of the distance from the center of the samples being filtered.

Decimating the data, such as by using a sinc function, reduces memory overhead and increases speed of processing and plotting. After decimating, the data is further reduced in size by changing the bit depth of the audio samples. For example, most audio files stored on computers use 16 bits to represent one sample of audio. In one embodiment of the present invention, the sample size is reduced to 8 bits of data by truncation and rounding techniques. Bit depth reduction alone lowers the memory footprint of the audio data by 50%. Thus, the overall data size of a 16 bit stereo file can be reduced to 1/1600th of its original size during the processing of the data prior to plotting and saving to disk. In summary, such memory savings comes from coalescing stereo data (reduced to ½ the size), reducing bit depth (reduced to ½ the size again), and decimating the audio data by a 400 point sinc function (reduced additionally to 1/400th of the size).

Caching and Saving the Waveform

Typically, displaying audio waveforms is a slow, computationally expensive process that consumes a significant amount of memory. Techniques for displaying audio waveforms can require (1) the audio data for the waveform be read from disk, (2) the waveform to be calculated from the audio data, and (3) the waveform to be drawn to the screen, each time a particular audio waveform is to be displayed.

In some embodiments, caching is used to solve performance problems associated with known waveform display techniques. In one embodiment, the waveform is calculated from the audio data only once during the lifetime of a "project" in movie editing software, or other software that uses the techniques of the present invention. Because the waveform is only calculated once from the audio data, the waveform does not have to be recalculated from data read from disk every time the waveform is to be displayed. In one embodiment, the waveform is calculated from the audio data only once during the lifetime of the audio data.

To cache the waveform after it has been calculated from the audio data, the audio data is transformed into a digital image representing the waveform during a first session of an application. A session is the period of time a user interfaces with an application; in this case, a media editing application. The session begins when the user accesses the application and ends when the user quits, or closes, the application. Before the first session ends, the digital image is durably saved to a persistent storage, such as a hard disks, floppy disks, optical disks, or tapes.

Input is received, e.g., from a user, to initiate a second session of the application. Input is also received to load the digital image from persistent storage. The digital image is loaded by reading the digital image from the persistent storage and displaying the digital image on a computer display, e.g., via a graphical user interface. Consequently, the digital image only needs to be calculated and generated once.

More specifically, audio data is drawn once into a digital image, and the digital image is saved. Typically, the saved image is much smaller than the actual audio data that it represents and therefore much faster to load and display. Using common fast graphic routines, the saved image may be resized or cropped as needed within a user interface. The "previously-calculated" image may also be presented with faded opacity, while the waveform is being recalculated, to indicate to a user that waveform processing is in progress. Thus, displaying a waveform in this manner is much faster than known methods of recalculating and displaying audio waveforms.

Precision Alignment Guides

As discussed above, techniques are provided to display a waveform graphic of audio data from an audio clip. These waveforms may be used to align video or photo clips with key audio events. Although many visual representations of an audio clip, such as audio clip 101 in FIG. 1, will suffice in aligning media clips, waveforms may be more useful since waveforms visually depict information about the underlying audio data associated with the audio clip. For example, the composite waveforms described above depict the intensity of audio data over time. Illustration of the changes in audio intensity over time is helpful because such changes indicate likely key audio events.

"Snapping" refers to the process of automatically aligning a particular point in a media clip, such as a video clip, with a particular point in another media clip, such as at the beginning or ending of an audio clip. For example, a user "drags" a first visual representation (e.g., waveform) of a first media clip using an input device, such as a mouse, and aligns an edge of the first visual representation with an edge of a second visual representation of a second media clip. When the edge of the first visual representation arrives within a few pixels of the edge of the second visual representation, the edge of the first visual representation "snaps into place," or automatically aligns with the edge of the second visual representation.

Typically, a user desires to align media clips so that the beginning of one media clip coincides with the beginning or end of another media clip. For instance, the user may wish to have her favorite music begin when video of her high school graduation ceremony begins. In this scenario, the user would using snapping align the beginning edge of the visual representation of the music clip with the beginning edge of the visual representation of the video clip.

However, given current snapping techniques, if the music clip begins with silence, as many audio clips do, the user will have to manually identify when the music begins and then manually align the beginning of the audio in the music clip with the beginning edge of the visual representation of the video clip. Thus, current techniques do not snap intra-clip points of interest (POI) of a media clip with an edge or intra-clip POI of another media clip.

Intra-Clip POI

According to an embodiment of the invention, a technique is provided for aligning an intra-clip POI of a media clip with an intra-clip POI or edge of a visual representation of another media clip. Instead of simply snapping to an edge of a visual representation of a media clip, it is now possible to snap to key events (i.e., intra-clip POIs) within a media clip. An intra-clip POI is any point within a media clip, excluding the exact beginning and ending of the media clip, with which a user might be interested in aligning another media clip.

Intra-clip POIs include, but are not limited to the beginning and ending of silence in a media clip, and peaks of audio intensity within the media clip, such as rhythmic beats. There may be many other "interesting" points within a media clip that can be identified and subsequently used to align multiple media clips. Thus, key events in a media clip (such as the beginning of video in a video clip) may be aligned with, or "snapped" to, key events in another media clip (such as the beginning of audio in an audio clip).

As a user "drags" the visual representation of a first media clip, instead of struggling to position a first point (i.e., intra-clip POI) in the visual representation of the first media clip at a second point (e.g., an edge or intra-clip POI) in the visual representation of the second media clip, the first point will "snap," or automatically align, with the second point when the first point arrives within a certain number of pixels of the second point.

For example, when editing media clips with movie editing software, an audio peak in the visual representation of an audio clip may be defined as an intra-clip POI and later used to align the audio clip with video in a movie. As another example, video frames may be set to start or end exactly at the start or end of the audio with no awkward moments of silence. As another example, when creating a slideshow, digital image clips may be set to change at audio peaks, such as a drumbeat or guitar solo, in an audio file.

In one embodiment, a snap timeline feature is implemented by displaying a snap line at the beginning and end of video and/or audio within a media clip. A snap line provides the user with a visual cue of precisely where an intra-clip POI is located so that the user may more easily align multiple media clips. The snap line may be colored differently than the colors immediately around the snap line in order for the snap line to stand out in the display.

In addition, a snap line may be set at other intra-clip POIs. For example, movie editing software utilizing the disclosed techniques may be configured to display a snap line whenever three or more frames of audio silence occur. Also, snap lines may be configured to display at peaks of the waveforms that indicate loud audio events or peaks of audio transients. Snap lines may also be configured when intensity of the audio falls below a certain level and when intensity of the audio rises above a certain level. As will be apparent to those skilled in the art, many intra-clip POIs in media clips may be appropriate for snap lines, and snap lines may be configured and determined in many ways.

Typically, snap lines mark the beginning and end of clips and transitions in the timeline. Snap lines may become visible as audio clips are dragged along a timeline. When snap lines of the audio and video are aligned, this "timeline snap" feature allows a very precise fit between audio and video data that would be difficult to achieve without snap lines. The timeline snap feature is a powerful editing feature for movie editing software.

In one embodiment, the timeline snap feature is implemented by marking the locations where zero intensity audio begins and/or ends in the graphic waveform (i.e., intra-clip POIs) associated with the audio clip. In this context, a zero intensity location may be any location where the intensity falls below a certain threshold (i.e., zero intensity need not be absolute zero). These "zero locations" may serve as alignment guides. Thus, as a user drags another media clip across the timeline, whenever an alignment guide is approached, a snap line is drawn on the screen. The snap line shows where the other media clip may "snap" to, such as the beginnings or endings of the zero locations, or other intra-clip POIs.

For example, music stored in an audio file typically has silence at the beginning of the file. When a user wants a video clip to start at the same time the music in the audio file begins, the video clip may be dragged and "snapped" to the first non-zero location (i.e. an intra-clip POI). When the user "drags" an edge of the visual representation of the video clip within a few pixels of the intra-clip POI in the audio clip, a snap line may be drawn at the intra-clip POI and the video clip is automatically snapped to that location without the user having to manually position the edge of the visual representation of the video clip next to the intra-clip POI.

Figure 4:
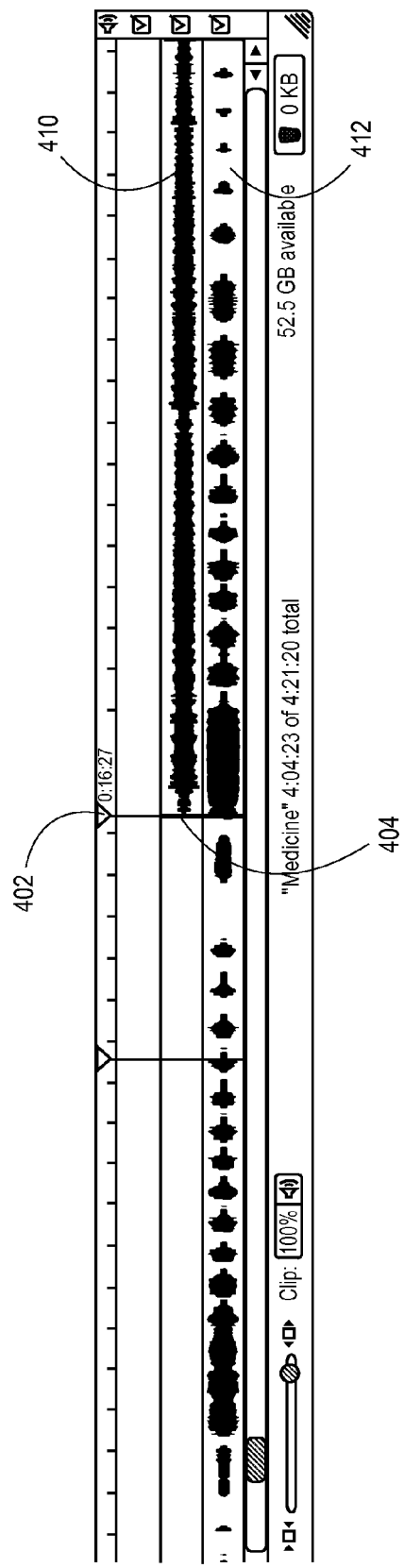
FIG. 4 is a representative screenshot illustrating a "timeline snap" feature according to one embodiment of the invention, according to an embodiment of the invention.

FIG. 4 illustrates one example of how snap lines may be used to align clips, according to an embodiment of the invention. As shown in FIG. 4, a snap pointer 402 is located at the left edge of a top clip 410. The left edge of top clip 410 is being aligned with an intra-clip POI (e.g., beginning of audio) in a bottom clip 412. As a user drags top clip 410 left and right, top clip 410 "snaps" into place when an edge of top clip 410 is within a few pixels of an intra-clip POI (i.e., snap location) in bottom clip 412.

A snap line 404 may be drawn as a visual indicator of an intra-clip POI. Each snap location in bottom clip 412 may be visually indicated simultaneously with a separate snap line, or only the snap lines within a specified number of pixels from an edge of a selected media clip (i.e. top clip 410) may be generated.

The user may also drag top clip 410 left and right by attaching snap pointer 402 with an edge of top clip 410. Thus, as snap pointer 402 is dragged left and right, top clip 410 is also moved left and right. Once the snap is made, snap line 404 may change color indicating a snap. The audio in top clip 410 will then start in sync with a sound in the middle of the bottom clip 412, as indicated in FIG. 4.

According to one embodiment, a short "pop" sound may be played in addition to, or to the exclusion of, the visual indications described above when a media clip is snapped. Audible indications, such as a "pop" or "click" provide further alignment feedback to the user. Users may configure whether the pop sound is played.

In sum, the snapping technique described herein allows users to quickly identify intra-clip POIs and easily align media clips to locations of silence or other intra-clip POIs within media clips.

Hardware Overview

Figure 5:
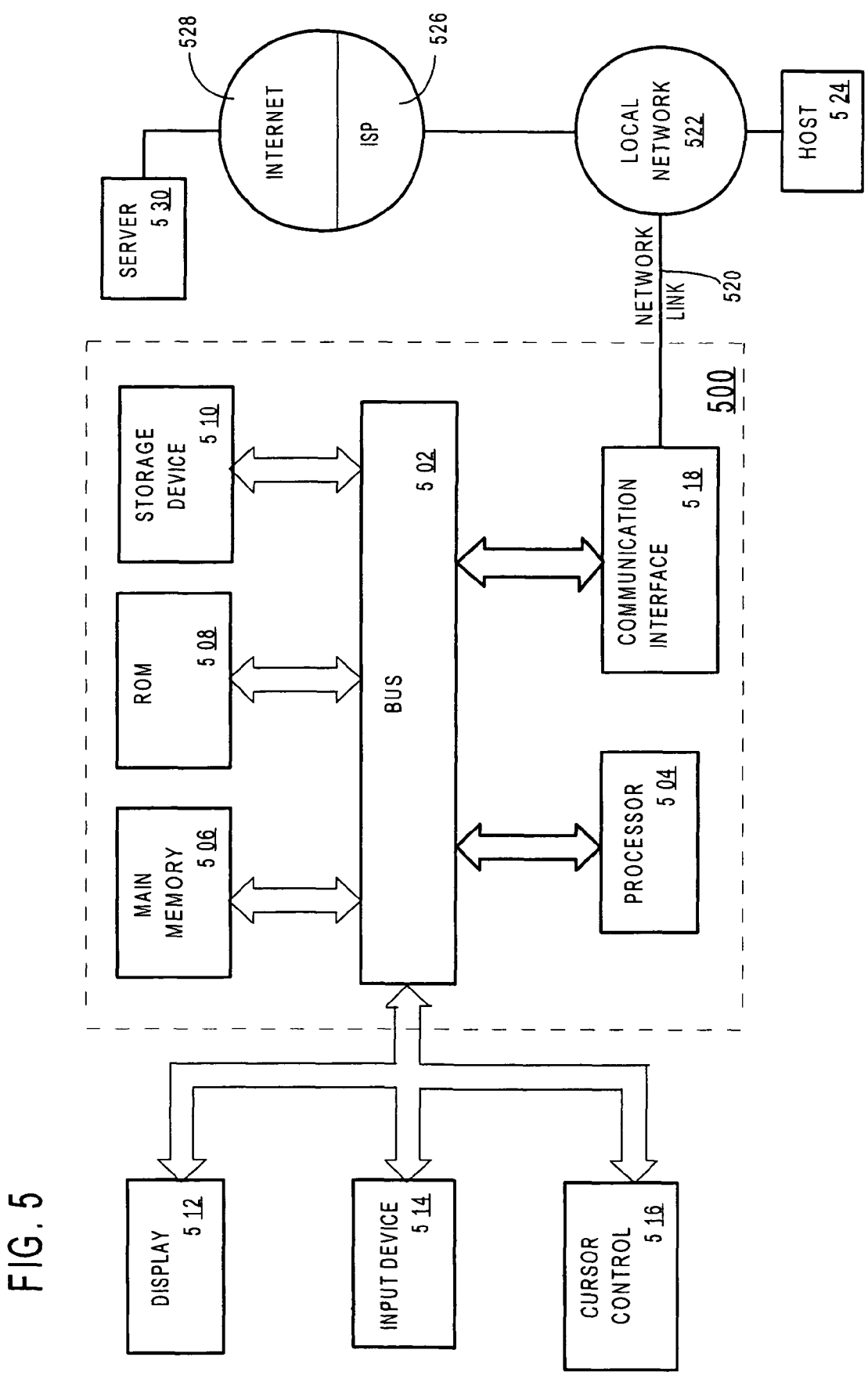
FIG. 5 is a block diagram that depicts a computer system upon which an embodiment of the invention may be implemented.

FIG. 5 is a block diagram that depicts a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media may also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer may read.

Various forms of computer readable media may be involved in carrying one or more sequences of one or more instructions to processor 504 for execution. For example, the instructions may initially be carried on a magnetic disk of a remote computer. The remote computer may load the instructions into its dynamic memory and send the instructions over a telephone line using a modem. A modem local to computer system 500 may receive the data on the telephone line and use an infra-red transmitter to convert the data to an infra-red signal. An infra-red detector may receive the data carried in the infra-red signal and appropriate circuitry may place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 550 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 may send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

What is claim is:

1. A method comprising the steps of:
generating a first visual representation of a first media clip;
generating a second visual representation of a second media clip;
automatically analyzing the first media clip to identify a first point within the first media clip, wherein the first point is an intra-clip point of interest (POI) that is neither the beginning of the first media clip nor the end of the first media clip;
after identifying the first point, generating a visual indication of the first point;
receiving input that drags one of the first visual representation and the second visual representation relative to the other of the first visual representation and the second visual representation;
while receiving said input, monitoring the distance between the first point of the first visual representation and a second point of the second visual representation;
in response to detecting that the distance falls below a threshold while one of the first visual representation and the second visual representation is being dragged, automatically shifting one of the first or second visual representations to cause the first point and the second point to be aligned;
wherein the method is performed by one or more computer systems.

2. The method of claim 1, wherein the intra-clip POI of the first media clip corresponds to at least one of the following: the beginning of silence within the first media clip, the end of silence within the first media clip, and peaks of audio intensity within the first media clip.

3. The method of claim 2, wherein the second point of the second visual representation is either an edge of the second visual representation or an intra-clip POI of the second media clip.

4. The method of claim 1, wherein at least one of the visual representations includes an audio waveform.

5. The method of claim 1, wherein automatically shifting includes automatically shifting when the first point of the first visual representation is within a number of pixels of the second point of the second visual representation.

6. The method of claim 1, wherein the visual indication is generated in response to detecting that the first point is within the particular distance from the second point.

7. The method of claim 6, wherein the color of the visual indication is a different color than the colors of objects immediately around the visual indication.

8. The method of claim 1, further comprising:
generating a third visual representation of a third media clip;
loading the third visual representation; and
in response to loading the third media clip, automatically aligning a third point in the third visual representation with the first point of the first visual representation.

9. A method comprising the steps of:
at a first point in time, a media editing application displaying an audio clip waveform by:
reading audio data from storage;
calculating, based on the audio data, an audio clip waveform, wherein the audio clip waveform represents one or more characteristics of the audio data;
causing the audio clip waveform to be displayed on a screen;
caching the audio clip waveform for subsequent use by the media editing application by:
generating, by the media editing application, a digital image that depicts the audio clip waveform as the audio clip waveform appeared at a particular point in time;
durably storing, by the media editing application and separate from the audio data, the digital image to a persistent storage;
at a second point in time, the media editing application displaying the audio clip waveform by:
in response to receiving input that requires redisplay of the audio clip waveform:

reading the digital image from the persistent storage without calculating the audio clip waveform based on the audio data, and displaying the audio clip waveform as the audio waveform appeared at the particular point in time by causing the digital image to be displayed via a user interface;

after the audio clip waveform is redisplayed based on the digital image, the media editing application allowing edit operations, to be performed on the audio data, using the redisplayed audio clip waveform;

wherein the method is performed by one or more computer systems.

10. The method of claim 9, further comprising:

receiving second input to perform at least one of resizing or cropping of the digital image; and resizing or cropping the digital image based on the second input.

11. The method of claim 9, wherein the digital image is generated during a first session of the media editing application used to generate the digital image, and the method further comprising:

in response to receiving second input, exiting the media editing application, wherein all processes associated with the media editing application are terminated;

in response to receiving third input, initiating a second session of the media editing application;

receiving fourth input to load the audio waveform;

reading, from the persistent storage, the digital image that represents the audio clip waveform; and displaying the digital image via the user interface.

12. One or more storage media storing instructions which, when executed by one or more processors, cause the performance of:

generating a first visual representation of a first media clip;

generating a second visual representation of a second media clip;

analyzing the first media clip to identify a first point within the first media clip, wherein the first point is an intra-clip point of interest (POI) that is neither the beginning of the first media clip nor the end of the first media clip;

after identifying the first point, generating a visual indication of the first point;

receiving input that moves one of the first visual representation and the second visual representation relative to the other of the first visual representation and the second visual representation;

while receiving said input, when the first point of the first visual representation is within a particular distance from a second point of the second visual representation, automatically shifting one of the first or second visual representations to cause the first point and the second point to be aligned.

13. The one or more storage media of claim 12, wherein the intra-clip POI of the first media clip corresponds to at least one of the following: the beginning of silence within the first media clip, the end of silence within the first media clip, and peaks of audio intensity within the first media clip.

14. The one or more storage media of claim 13, wherein the second point of the second visual representation is either an edge of the second visual representation or an intra-clip POI of the second media clip.

15. The one or more storage media of claim 12, wherein at least one of the visual representations includes an audio waveform.

16. The one or more storage media of claim 12, wherein automatically shifting includes automatically shifting when the first point of the first visual representation is within a number of pixels of the second point of the second visual representation.

17. The one or more storage media of claim 12, wherein the visual indication is generated in response to detecting that the first point is within the particular distance from the second point.

18. The one or more storage media of claim 17, wherein the color of the visual indication is a different color than the colors of objects immediately around the visual indication.

19. The one or more storage media of claim 12, wherein the instructions are instructions which, when executed by the one or more processors, further cause:

generating a third visual representation of a third media clip;

loading the third visual representation; and in response to loading the third media clip, automatically aligning a third point in the third visual representation with the first point of the first visual representation.

20. One or more storage media storing instructions which, when executed by one or more processors, cause the performance of:

at a first point in time, a media editing application displaying an audio clip waveform by:

reading audio data from storage;

calculating, based on the audio data, an audio clip waveform, wherein the audio clip waveform represents one or more characteristics of the audio data;

causing the audio clip waveform to be displayed on a screen;

caching the audio clip waveform for subsequent use by the media editing application by:

generating, by the media editing application, a digital image that depicts the audio clip waveform;

durably storing, by the media editing application and separate from the audio data, the digital image to a persistent storage;

at a second point in time, the media editing application displaying the audio clip waveform by: in response receiving input that requires redisplay of the audio clip waveform:

reading the digital image from the persistent storage without calculating the audio clip waveform based on the audio data, and displaying the audio clip waveform as the audio waveform appeared at the particular point in time by causing the digital image to be displayed via a user interface;

after the audio clip waveform is redisplayed based on the digital image, the media editing application allowing edit operations, to be performed on the audio data, using the redisplayed audio clip waveform.

21. The one or more storage media of claim 20, wherein the instructions are instructions which, when executed by the one or more processors, further cause:

receiving second input to perform at least one of resizing or cropping of the digital image; and resizing or cropping the digital image based on the second input.

22. The one or more storage media of claim 20, wherein the digital image is generated during a first session of the media editing application used to enerate the digital image, and wherein the instructions are instructions which, when executed by the one or more processors, further cause:

in response to receiving second input, exiting the media editing application, wherein all processes associated with the media editing application are terminated;

in response to receiving third input, initiating a second session of the media editing application;
receiving fourth input to load the audio waveform;
reading, from the persistent storage, the digital image, that represents the audio clip waveform; and
displaying the digital image via the user interface.

23. An apparatus comprising:
one or more processors;
one or more storage media storing instructions which, when executed by the one or more processors, cause the performance of:
generating a first visual representation of a first media clip;
generating a second visual representation of a second media clip;
analyzing the first media clip to identify a first point within the first media clip, wherein the first point is an intra-clip point of interest (POI) that is neither the beginning of the first media clip nor the end of the first media clip;
after identifying the first point, generating a visual indication of the first point;
receiving input that moves one of the first visual representation and the second visual representation relative to the other of the first visual representation and the second visual representation;
while receiving said input, when the first point of the first visual representation is within a particular distance from a second point of the second visual representation, automatically shifting one of the first or second visual representations to cause the first point and the second point to be aligned.

24. The apparatus of claim 23, wherein the intra-clip POI of the first media clip corresponds to at least one of the following: the beginning of silence within the first media clip, the end of silence within the first media clip, and peaks of audio intensity within the first media clip.

25. The apparatus of claim 24, wherein the second point of the second visual representation is either an edge of the second visual representation or an intra-clip POI of the second media clip.

26. The apparatus of claim 23, wherein at least one of the visual representations includes an audio waveform.

27. The apparatus of claim 23, wherein automatically shifting includes automatically shifting when the first point of the first visual representation is within a number of pixels of the second point of the second visual representation.

28. The apparatus of claim 23, wherein the visual indication is generated in response to detecting that the first point is within the particular distance from the second point.

29. The apparatus of claim 28, wherein the color of the visual indication is a different color than the colors of objects immediately around the visual indication.

30. The apparatus of claim 23, wherein the instructions are instructions which, when executed by the one or more processors, further cause:
generating a third visual representation of a third media clip;
loading the third visual representation; and
in response to loading the third media clip, automatically aligning a third point in the third visual representation with the first point of the first visual representation.

31. An apparatus comprising:
one or more processors;
one or more storage media storing instructions which, when executed by the one or more processors, cause performance of:
at a first point in time, a media editing application displaying an audio clip waveform by: reading audio data from storage;
calculating, based on the audio data, an audio clip waveform, wherein the audio clip waveform represents one or more characteristics of the audio data;
causing the audio clip waveform to be displayed on a screen;
caching the audio clip waveform for subsequent use by the media editing application by: generating, by the media editing application, a digital image that depicts the audio clip waveform;
durably storing, by the media editing application and separate from the audio data, the digital image to a persistent storage;
at a second point in time, the media editing application displaying the audio clip waveform by:
in response receiving input that requires redisplay of the audio clip waveform:
reading the digital image from the persistent storage without calculating the audio clip waveform based on the audio data, and displaying the audio clip waveform as the audio waveform appeared at the particular point in time by causing the digital image to be displayed via a user interface;
after the audio clip waveform is redisplayed based on the digital image, the media editing application allowing edit operations, to be performed on the audio data, using the redisplayed audio clip waveform.

32. The apparatus of claim 31, wherein the instructions are instructions which, when executed by the one or more processors, further cause:
receiving second input to perform at least one of resizing or cropping of the digital image; and
resizing or cropping the digital image based on the second input.

33. The apparatus of claim 31, wherein the digital image is generated during a first session of an application used to generate the digital image, and wherein the instructions are instructions which, when executed by the one or more processors, further cause:
in response to receiving second input, exiting the media editing application, wherein all processes associated with the media editing application are terminated;
in response to receiving third input, initiating a second session of the media editing application;
receiving fourth input to load the audio waveform;
reading, from the persistent storage, the digital image that represents the audio clip waveform; and
displaying the digital image via the user interface.

34. The method of claim 9, further comprising, while the digital image is displayed, re-calculating the audio clip waveform based on the audio data.

35. The one or more storage media of claim 20, wherein the instructions, when executed by the one or more processors, further cause, while the digital image is displayed, re-calculating the audio clip waveform based on the audio data.

36. The apparatus of claim 31, wherein the instructions, when executed by the one or more processors, further cause, while the digital image is displayed, re-calculating the audio clip waveform based on the audio data.

* * * * *